United States Patent
Branson et al.

(10) Patent No.: US 10,459,832 B2
(45) Date of Patent: Oct. 29, 2019

(54) HOW TO TRACK OPERATOR BEHAVIOR VIA METADATA

(71) Applicant: International Business Machines Corporation, Armonk, NY (US)

(72) Inventors: Michael J. Branson, Rochester, MN (US); James E. Carey, Rochester, MN (US); Jim C. Chen, Rochester, MN (US); Brian R. Muras, Ostego, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 14/717,572

(22) Filed: May 20, 2015

(65) Prior Publication Data

US 2016/0344605 A1  Nov. 24, 2016

(51) Int. Cl.
*H04L 12/26* (2006.01)
*G06F 11/36* (2006.01)

(52) U.S. Cl.
CPC ...... *G06F 11/3688* (2013.01); *G06F 11/3636* (2013.01); *G06F 11/3664* (2013.01); *H04L 43/00* (2013.01)

(58) Field of Classification Search
None
See application file for complete search history.

(56) References Cited

U.S. PATENT DOCUMENTS

| 8,909,671 | B2 | 12/2014 | Pallares Lopez et al. | |
| 2004/0153435 | A1* | 8/2004 | Gudbjartsson .... | G06F 17/30595 |
| 2005/0036606 | A1* | 2/2005 | Eisentraeger ......... | H04L 9/3073 380/28 |
| 2008/0127116 | A1* | 5/2008 | Kosche ................. | G06F 11/328 717/130 |
| 2008/0222087 | A1* | 9/2008 | Balmin ............. | G06F 17/30935 |
| 2009/0259641 | A1* | 10/2009 | Balmin ............. | G06F 17/30923 |
| 2009/0271529 | A1* | 10/2009 | Kashiyama ....... | G06F 17/30477 710/1 |
| 2010/0106853 | A1* | 4/2010 | Kashiyama ............ | G06Q 10/06 709/231 |

(Continued)

OTHER PUBLICATIONS

Chris Howard, "Introducing InfoSphere Streams 2.0 Features, Part 1: Application Monitoring with Metrics"; IBM Developer Works, Mar. 15, 2012.

*Primary Examiner* — Viet D Vu
*Assistant Examiner* — James A Edwards
(74) *Attorney, Agent, or Firm* — Patterson + Sheridan, LLP (57) ABSTRACT

Embodiments presented herein describe techniques for tracking operators of a distributed computing environment (e.g., a streams processing environment) using metadata. During execution of a distributed application of the computing environment, a tracker tool monitors a plurality of operators of the distributed application. Each of the operators stores one or more specified metadata values associated with the operator. For each operator, the tracker tool retrieves the one or more specified metadata values associated with the operator. Upon determining that one of the one or more specified metadata values do not comply with a corresponding expected metadata value, the tracker tool generates an indicator for the operator. The indicator includes information describing the one or more specified metadata values.

21 Claims, 6 Drawing Sheets

(56) References Cited

U.S. PATENT DOCUMENTS

| | | | |
|---|---|---|---|
| 2011/0264667 A1* | 10/2011 | Harizopoulos ... | G06F 17/30315 707/743 |
| 2013/0014088 A1* | 1/2013 | Park ................ | G06F 11/3636 717/128 |
| 2013/0031263 A1* | 1/2013 | Cradick ............ | H04L 69/08 709/230 |
| 2013/0166888 A1* | 6/2013 | Branson ............ | G06F 9/30 712/220 |
| 2013/0166962 A1* | 6/2013 | Branson ............ | G06F 11/3065 714/47.3 |
| 2013/0191306 A1* | 7/2013 | Wilkinson ......... | G06Q 10/067 705/348 |
| 2013/0238936 A1* | 9/2013 | Andrade ............ | G06F 11/3616 714/35 |
| 2013/0305227 A1* | 11/2013 | Branson ............ | G06F 11/362 717/128 |
| 2014/0040915 A1* | 2/2014 | Chen ................. | G06F 9/46 718/107 |
| 2014/0059212 A1 | 2/2014 | Gedik et al. | |
| 2014/0089929 A1* | 3/2014 | Branson ............ | H04L 29/08135 718/102 |
| 2014/0095445 A1* | 4/2014 | Deshmukh ........ | G06F 17/30463 707/661 |
| 2014/0122559 A1* | 5/2014 | Branson ............ | H04L 67/02 709/201 |

\* cited by examiner

HOW TO TRACK OPERATOR BEHAVIOR VIA METADATA

BACKGROUND

The present invention relates to distributed computing, and more specifically, to monitoring behavior of components of a distributed application.

In a streams processing environment, multiple nodes in a computing cluster execute a distributed application. The distributed application retrieves a stream of input data from a variety of data sources and analyzes the stream. A stream is composed of data units called "tuples," which is a list of values. Further, the distributed application includes processing elements that are distributed across the cluster nodes. Each processing element includes one or more operators configured to perform a specified task associated with a tuple. Each processing element receives one or more tuples as input and processes the tuples through the operators. Once performed, the processing element may output one or more resulting tuples to another processing element, which in turn performs a specified task on those tuples, and so on.

A developer for the distributed application may design an operator graph using an integrated design environment (IDE) tool. The operator graph specifies a desired configuration of processing elements and elements in the streams processing environment. The developer may define functions for each operator to perform via the operator graph. The functions can specify a given task to perform and a destination processing element for tuple output. Further, the IDE tool may provide a debugger that allows the developer to ensure that the distributed application executes in the streams processing environment as specified.

SUMMARY

One embodiment presented herein describes a method. The method generally includes, during execution of a distributed application, monitoring a plurality of operators of the distributed application. Each of the plurality of operators storing one or more specified metadata values associated with the operator. For each operator, one or more specified metadata values associated with the operator are retrieved. Upon determining, for that operator, that at least one of the one or more specified metadata values do not comply with a corresponding expected metadata value, an indicator for the operator is generated. The indicator includes information describing the one or more specified metadata values.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Embodiments presented herein describe techniques for tracking operator behavior in a distributed application. In one embodiment, a distributed application executes in a computing cluster of a streams processing environment. Processing elements of the distributed application execute in the nodes and retrieve streams of input called "tuples," which is a list of input values. Each processing element includes one or more operators that process the tuples and output resulting tuples to other processing elements. Each operator may serve a specified task, and therefore, a given operator may behave differently from another operator. A developer may construct, through an integrated design environment (IDE) tool, an operator graph that specifies a desired configuration of processing elements and operators in the streams processing environment.

In the streams processing environment, a developer (e.g., of the streams processing application, or of an operator graph) may want to ensure that an operator is performing as originally specified. For example, a developer may intend that a given operator receives a specified amount (or amount range) of tuples and sends another specified amount (or amount range) of tuples in a given timeframe. The developer may be concerned if that operator, during execution of the streams processing application, e.g., sends no tuples despite receiving the specified amount in the timeframe. Typically, to identify issues with a given operator, the developer manually evaluates a log of the entire streams processing domain. However, because the log can potentially include a voluminous amount of information, the developer might have difficulty determining relevant information from the log. For instance, the developer would have to know what to search for to identify potential issues for the operator.

Embodiments presented herein provide a tracker tool that monitors operator behavior during runtime of the streams processing environment. In one embodiment, a developer may use the tracker tool to assign various types of metadata to each operator, e.g., during the development phase of the streams application or an operator graph. Such metadata may include a various tuple rates associated with a given operator, such as an amount of tuples that are input to the operator within a specified time frame, or an amount of tuples that are output from the operator for a given input tuple. Metadata may also include port information associated with the operator. For example, the port information may include port type, such as whether a port is an overloaded port (where multiple tuples flow into the port) or a combination port (where an amount of tuples flowing into the port change based on data being processed by an operator).

In one embodiment, during execution of the streams processing application, the tracker tool may monitor specified metadata values of each operator in real-time. Further, the tracker tool may evaluate metadata values for each operator against expected values for that operator. For example, assume that the tracker tool monitors, for a given operator, metadata relating to an incoming tuple rate for that operator. If the observed metadata values do not comply with a specified value, the tracker tool may return an indication of such activity. For example, the tracker tool may present a graphical display of an operator graph during runtime of the streams processing application. In a case where operator behavior is abnormal, the tracker tool may create a graphical indication of the abnormality on the operator graph.

Advantageously, monitoring operator metadata allows a developer of the distributed application or an operator graph to track operator behavior in real-time. Further, the developer may specify types of metadata to track for each individual operator. Doing so results in the streams processing application providing information that the developer can use to better identify issues arising from each operator. For example, a graphical runtime display of an operator graph may present graphical indicators in cases where observed operator metadata values do not comply with expected metadata values. Such indicators may allow the developer to easily pinpoint operators that do not perform as specified by the developer.

Note, the following describes a distributed application of a streams processing environment as a reference example of an application executing in a cluster of computing nodes, where components in each node perform some task that results in data being output to other components. However, one of skill in the art will recognize that embodiments presented herein may be adapted to a variety of applications having components that output variable but expected amounts of data to other destinations.

Figure 1:
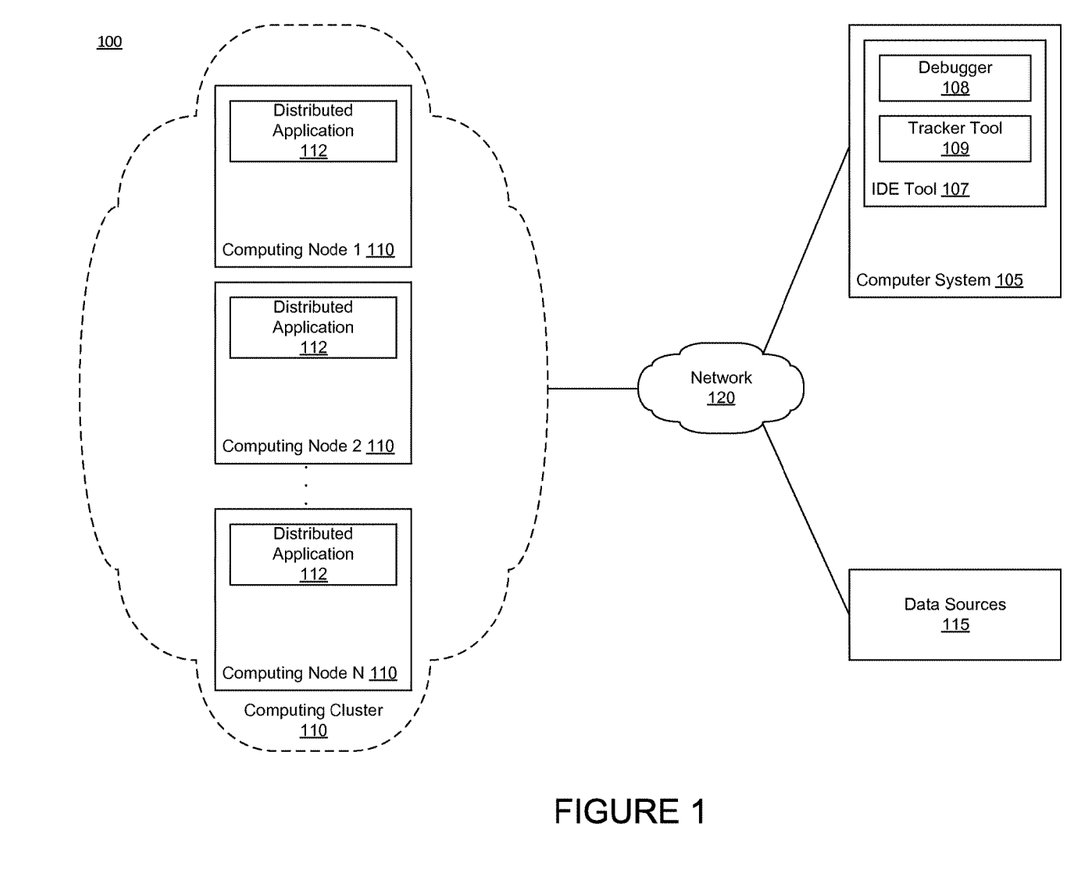
FIG. 1 illustrates an example computing environment, according to one embodiment.

FIG. 1 illustrates an example computing environment 100, according to one embodiment. As shown, computing environment 100 includes a computing cluster 110, a computer system 105, and one or more data sources 115. The computing cluster 110, computing system 105, and data sources 115 are each connected via a network 120 (e.g., the Internet).

In one embodiment, the computing cluster 110 includes multiple computing nodes 110. Each computing node may be a physical computing system or a virtual machine instance executing in a cloud computing environment. The nodes 110 each execute a distributed application 112. The distributed application 112 retrieves input streams of data from various data sources 115, e.g., over the network 120. Examples of such data include message data, XML documents, biometric data captured from an individual in real-time, etc. The distributed application 112 many analyze the input streams in manageable data units called "tuples." A tuple is a list of values. Further, the distributed application 112 includes processing elements executing on various nodes that perform a specified task using tuples as input. Tuples flow from processing element to processing element in the streams processing environment.

The computer system 105 may be a physical computing system or a virtual machine instance in a cloud environment. In one embodiment, the computer system 105 includes an integrated development environment (IDE) tool 107. A developer in the streams processing environment may configure processing elements using an operator graph in the IDE tool 107, e.g., to specify which particular nodes to execute a given processing element, to specify a function of a given operator, to specify a flow of tuples between operators and processing elements, etc. Further, the IDE tool 107 includes a debugger 108 and a tracker tool 109. The debugger 108 allows the developer to pinpoint anomalies that occur during runtime of the streams processing environment. For example, the debugger 108 can insert breakpoints at instances where a given processing element crashes, sends data to an unintended target processing element, etc.

In one embodiment, the tracker tool 109 monitors metadata assigned to operators in the streams processing environment, e.g., during runtime or debugging of the environment. A developer may assign various types of metadata to an individual operator using the tracker tool 109. An example of such metadata includes an amount of tuples that the operator generates for each tuple received, also known as a tuple rate. The tracker tool 109 may further categorize different types of tuple rates. For instance, the tracker tool 109 may organize tuple rates by operator port. A port is an input to an operator, where an operator can have one or more ports. Further, ports may be organized by type, such as an overloaded port or a combination port. At any rate, a developer may specify that the tracker tool 109 monitors such information for an individual operator. In one embodiment, metadata specified for a given operator may indicate that values corresponding to that metadata are variable (e.g., over time). For example, metadata associated with an operator may specify that a tuple rate for a given operator port may be different during specified hours of a day.

Further, the tracker tool 109 allows a developer to specify expected metadata values (or ranges of values) for a given metadata type. As a result, during execution of the distributed application 112, the tracker tool 109 may evaluate observed metadata values with the expected metadata values. If the observed metadata values do not comply with the expected metadata values, the tracker tool 109 may return an indication, e.g., to the debugger 108 or to a management console for the distributed application 112. For example, the management console may provide a graphical display of the operator graph. If the management console receives an indication that observed metadata values of a given operator do not comply with expected values, the management console may provide a graphical indicator to that operator (e.g., by highlighting the operator with a specified color). Doing so allows a developer or an administrator to determine whether that operator is causing issues. As another example, if distributed application 112 receives an indication that the observed metadata values do not comply with expected values, then the distributed application 112 may control the behavior of the operator. For example, assume that an operator is associated with expected metadata values for incoming tuples of a given range, such as temperatures from 1 to 100 degrees Celsius. If the distributed application 112 receives an indication that the observed metadata values in that operator are outside of that range, the distributed application 112 may perform a different action as a result, e.g., by not processing the input tuple, by not outputting a resulting tuple for that input tuple, etc.

Figure 2:
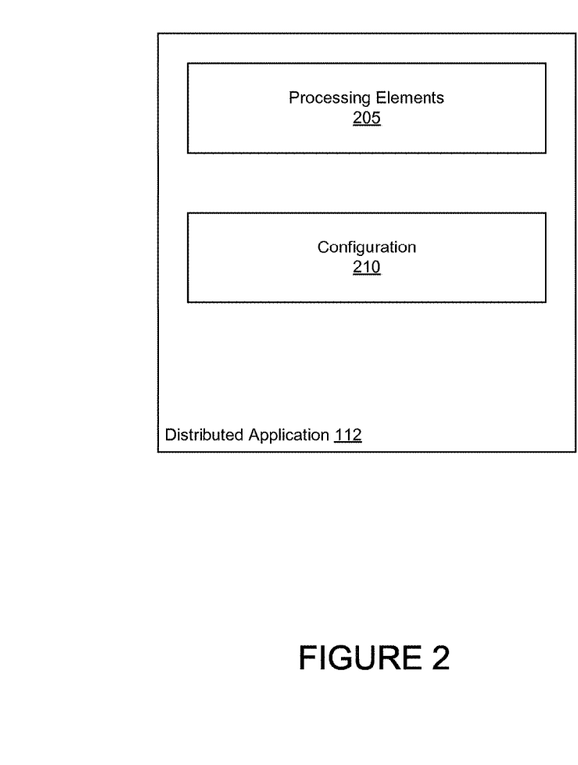
FIG. 2 further illustrates the distributed streams processing application described relative to FIG. 1, according to one embodiment.

FIG. 2 further illustrates the distributed application 112 described relative to FIG. 1, according to one embodiment. As shown, the distributed application 112 includes one or more processing elements 205 and a configuration 210.

As stated, processing elements 205 may be distributed to various nodes in the computing cluster 105. Each processing element 205 includes one or more operators. Each operator may perform a specified task associated with a data workload. For example, one operator may receive a tuple that consists of comma-delineated text values. The operator may determine the number of times a given term appears in the tuple and send the result to another operator, in addition to other specified information.

The configuration 210 specifies properties of the streams processing environment. For example, such properties may describe which node a given processing element 205 is located, a specified flow of data between processing elements 205, address information of each node, identifiers for processing elements 205, and the like.

Figure 3:
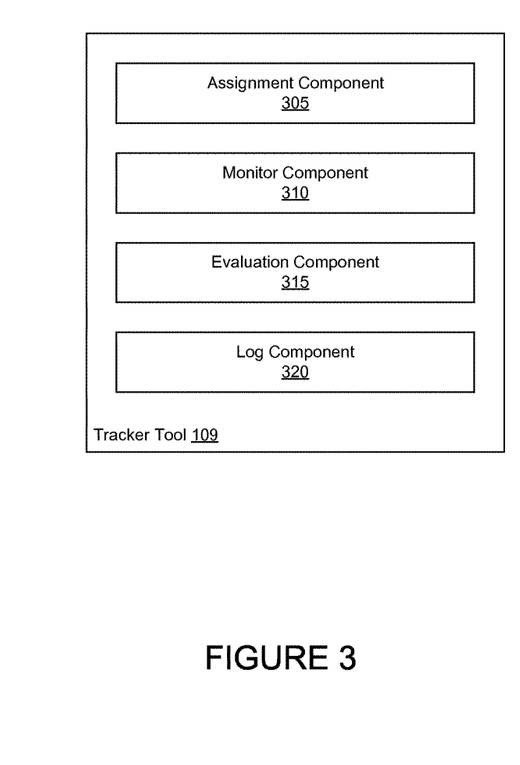
FIG. 3 further illustrates the tracker tool described relative to FIG. 1, according to one embodiment.

FIG. 3 further illustrates the tracker tool 109, according to one embodiment. As shown, the tracker tool 109 includes an assignment component 305, a monitor component 310, an evaluation component 315, and a log component 320.

In one embodiment, the assignment component 305 associates metadata types to a given operator. A developer of the distributed application 112 or an operator graph may associate different types of metadata to the operator through the assignment component 305. Generally, metadata for the operator describes how the operator should perform. As stated, examples of metadata include tuple rates, e.g., tuples flowing out of a given operator within a specified timeframe. Metadata also includes port information. For instance, an operator may include one or more ports that receive input tuple streams. Further, an operator may have different types of ports. For example, an operator may have an overloaded port that receives multiple tuple streams at that port. As another example, an operator may have a combined port that changes the amount of tuples received at that port based on the amount of data being processed by the operator. Further, metadata specified for a given operator may indicate that values corresponding to that metadata are variable (e.g., over time). In any case, the assignment component 305 associates such metadata with a specified operator.

In one embodiment, the assignment component 305 may associate expected values for a given metadata type specified for an operator. Doing so allows the developer to specify expected values or ranges for metadata values that the developer, during operator design, anticipates the operator should generate while the distributed application 112 is executing.

In one embodiment, the monitor component 310 observes operators during runtime of the streams processing application. In particular, the monitor component 310 captures values for metadata types assigned to each operator. The monitor component 310 can do so at specified time intervals, e.g., once every minute, once every half hour, etc.

In one embodiment, the evaluation component 315 receives observed metadata values from the monitor component 310 and compares the observed metadata values with expected values. The evaluation component 315 determines, based on the comparison, whether the observed values comply with the expected values (or value ranges).

In one embodiment, the log component 320 generates indicators for the debugger 108 or a management console for the distributed application 112 for instances where operator metadata values do not comply with associated expected values. The indicator may provide information relating to the operator, such as observed metadata values, expected metadata values, tuple counts, port information, and the like. As an example, the management console may provide a graphical display of an operator graph. When the management console receives an indicator that a given operator has metadata values that do not comply with an expected value, the management console may highlight that operator on the graphical display of the operator graph. The management console may also provide associated information for that operator. The distributed application 112 may also modify the operator behavior such that the operator processes tuples differently based on the indication. For example, if observed metadata values for a tuple are outside of an expected range, the operator may process that tuple differently than previously specified (e.g., by not outputting a resulting a tuple).

Further, the log component 320 may record and store such instances into a log for an administrator or developer to review.

Figure 4:
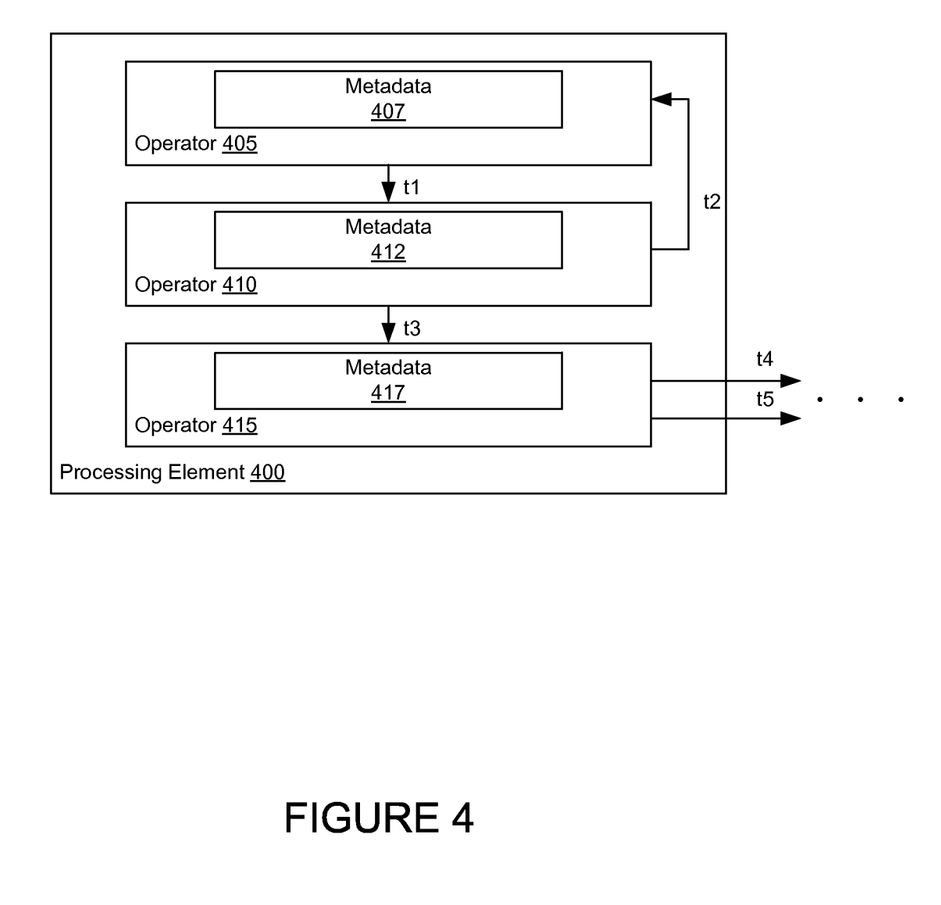
FIG. 4 illustrates an example processing element, according to one embodiment.

FIG. 4 illustrates an example processing element 400, according to one embodiment. As shown, the processing element 400 includes operators 405, 410, and 415. Illustratively, tuples t1-t5 flow from each operator to destination operators or to destination processing elements. Multiple tuples may flow from a given operator or processing element. As shown, each of the operators 405, 410, and 415 include metadata 407, 412, and 417, respectively. As stated, the assignment component 305 may associate specified metadata to a given operator. Thus, for example, the types and values observed in metadata 407 may differ from those observed in metadata 412.

Figure 5:
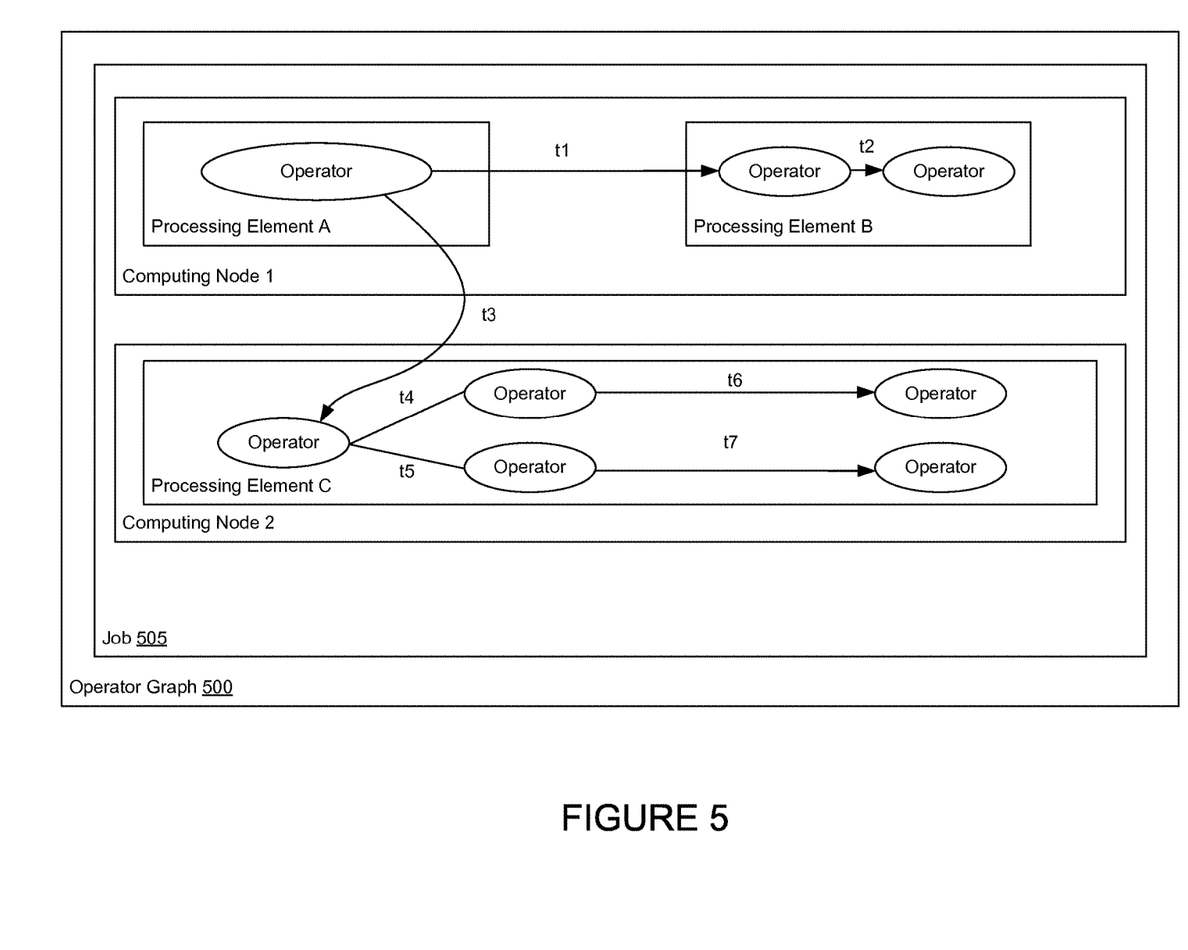
FIG. 5 illustrates an example operator graph, according to one embodiment.

FIG. 5 illustrates an example operator graph 500, according to one embodiment. As stated, the operator graph 500 depicts a configuration of the streams processing environment. A developer can specify, e.g., using the IDE tool 107, which computing nodes host a given processing element Likewise, the developer can also specify which processing elements execute a given operator. Illustratively, operator graph 500 depicts a configuration of computing nodes, processing elements, operators, and tuples t1-t7 relative to a job 505. For example, computing node 1 is configured with two processing elements A and B. An operator in processing element A outputs tuple t1 to an operator in processing element B. Further, the same operator also outputs a tuple t3 to an operator in processing element C, hosted by computing node 2.

In one embodiment, the distributed application 112, e.g., through a management console, may provide a graphical display of the operator graph 500. The graphical display allows a developer to view a flow of tuples t1-t7 during execution of the distributed application 112. Further, as stated, the developer may assign metadata to each individual operator in the operator graph 500. The graphical display may indicate cases where metadata values for a given operator does not comply with expected values.

Figure 6:
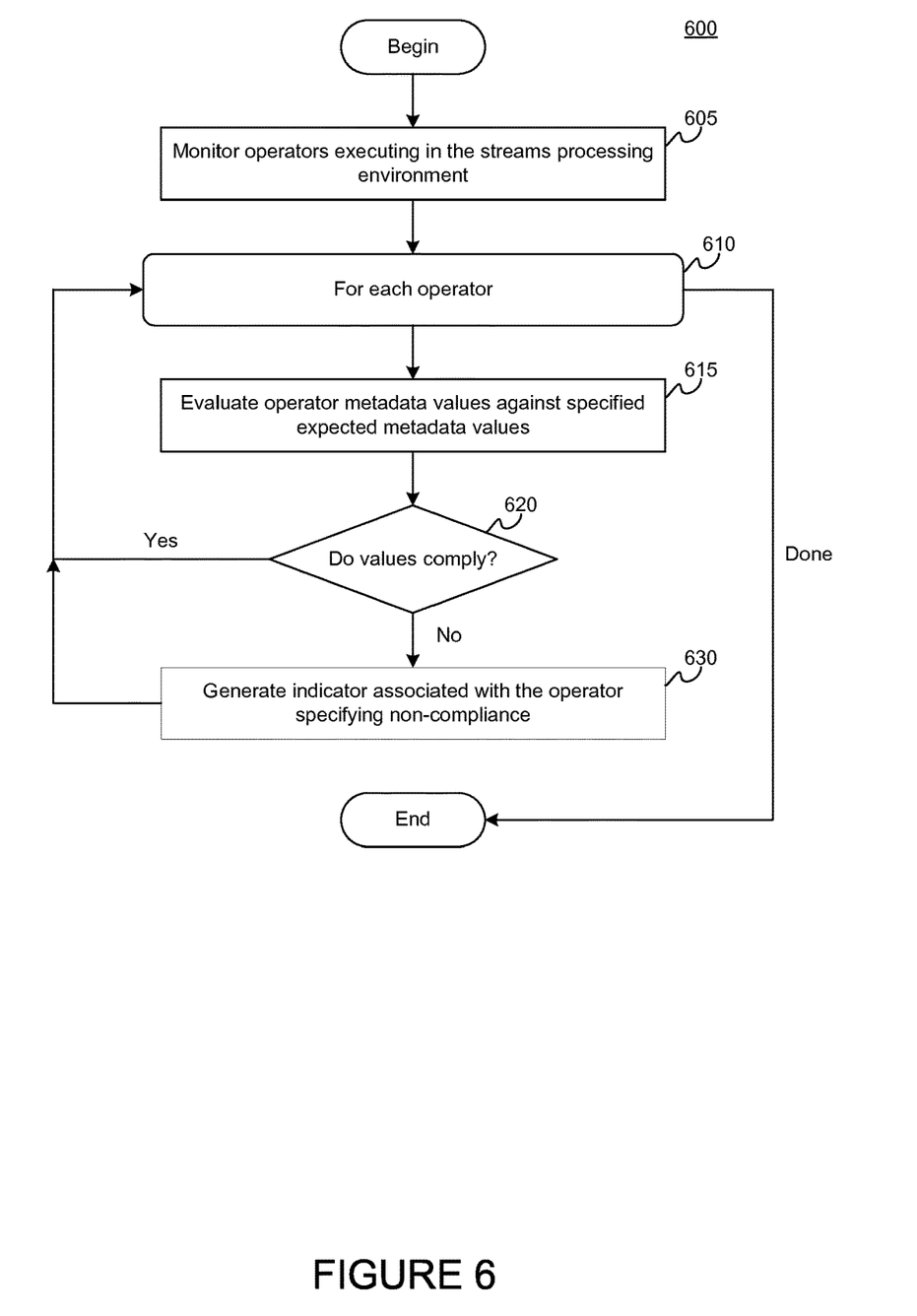
FIG. 6 illustrates a method for tracking operator behavior during runtime of a distributed streams processing application, according to one embodiment.

FIG. 6 illustrates a method 600 for tracking operator behavior during runtime of a distributed streams processing application, according to one embodiment. As shown, method 600 begins at step 605, where the monitor component 310 observes operators executing in the streams processing environment. The monitor component 310 tracks operator metadata values in real-time, such as tuple rates for different ports of a given operator for a given timeframe.

At step 610, the following steps are performed for each operator. At step 615, the evaluation component 315 compares an observed operator metadata value against an expected metadata value (or range of values). For example, assume that for a given operator, the tracker tool 109 monitors metadata values for tuples flowing out of an overloaded port for the operator. Expected metadata values may be specified by the developer when the metadata is assigned.

At step 620, the evaluation component 315 determines whether the observed metadata values comply with the expected metadata values. If so, then the method returns to step 615 until each operator is evaluated. If not, then the log component 320 generates an indicator associated with that operator. The indicator may include information associated with the operator, such as the observed and expected metadata values. A management console of the distributed application 112 can receive the indicator and highlight the operator in a graphical display of the corresponding operator graph. The log component 320 may also record such information to a log.

Figure 7:
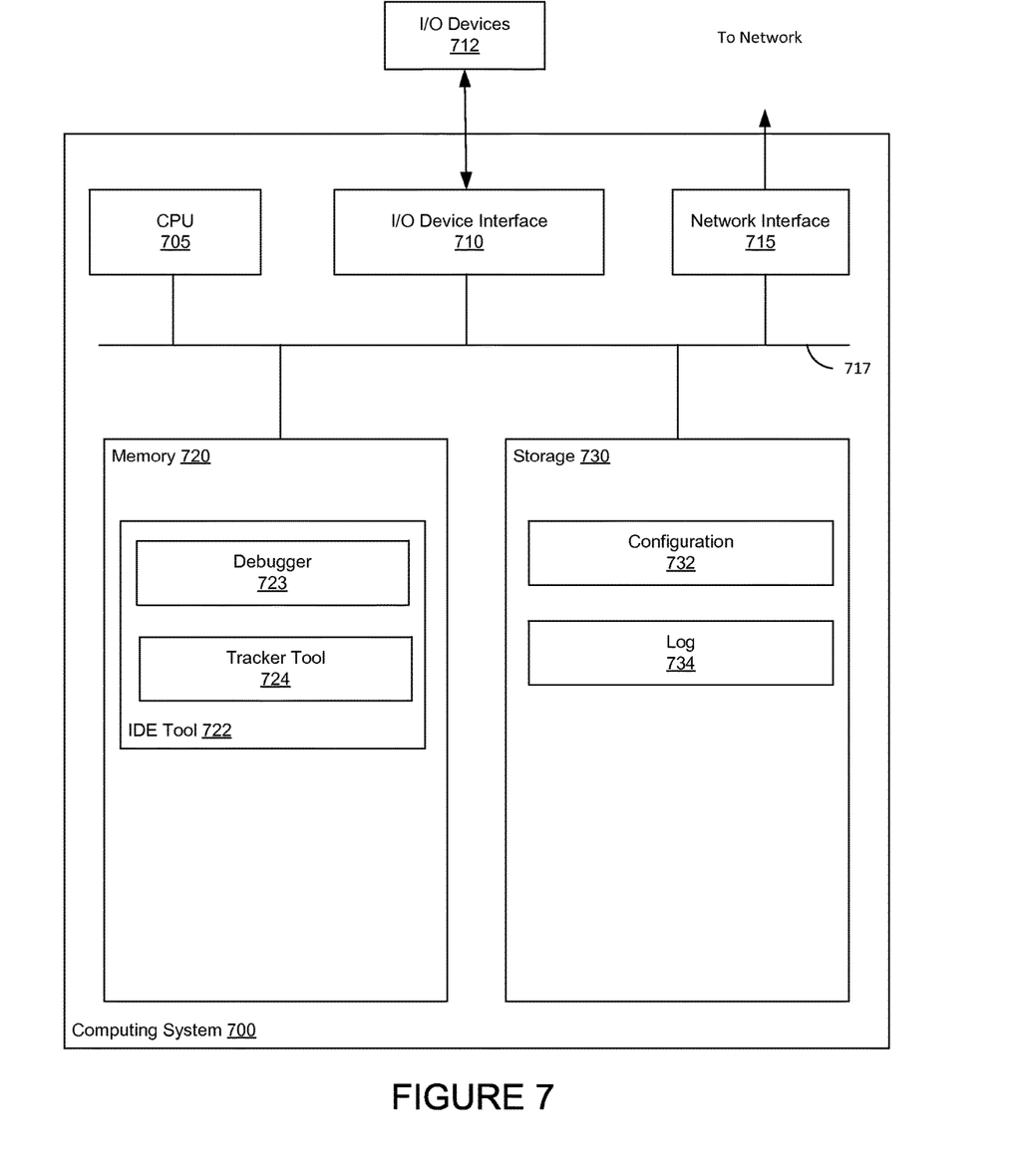
FIG. 7 illustrates a computing system configured to track operator behavior during runtime of a distributed streams processing application, according to one embodiment.

FIG. 7 illustrates a computing system configured to track operator behavior during runtime of a distributed streams processing application, according to one embodiment. As shown, the computing system 700 includes, a central processing unit (CPU) 705, a network interface 715, a memory 720, and storage 730, each connected to a bus 717. The computing system 700 may also include an I/O device interface 710 connecting I/O devices 712 (e.g., keyboard, display and mouse devices) to the computing system 700. Further, in context of this disclosure, the computing elements shown in the computing system 700 may correspond to a physical computing system.

CPU 705 retrieves and executes programming instructions stored in memory 720 as well as stores and retrieves application data residing in the storage 730. The bus 717 is used to transmit programming instructions and application data between CPU 705, I/O devices interface 710, storage 730, network interface 717, and memory 720. Note, CPU 705 is included to be representative of a single CPU, multiple CPUs, a single CPU having multiple processing cores, and the like. Memory 720 is generally included to be representative of a random access memory. Storage 730 may be a disk drive storage device. Although shown as a single unit, storage 730 may be a combination of fixed and/or removable storage devices, such as fixed disc drives, removable memory cards, or optical storage, network attached storage (NAS), or a storage area-network (SAN).

Illustratively, memory 720 includes an integrated development environment (IDE) tool 722. And storage 630 includes a configuration 732 and a log 734. A developer uses the IDE tool 722 to design processing elements and operators in a streams processing environment. The IDE tool 722 itself includes a debugger 723 and a tracker tool 724. The debugger 723 inserts breakpoints at instances where a given processing element crashes, sends data to an unintended target processing element, etc. The tracker tool 724 monitors metadata assigned to operators in the streams processing environment, e.g., during runtime or debugging of the environment. The tracker tool 724 evaluates observed metadata values of an operator with specified expected metadata values (or value ranges). The tracker tool 724 may generate an indication of observed values not complying with expected values. Further, the tracker tool 724 can record such instances to the log 734.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the tracker tool) or related data available in the cloud. For example, the tracker tool could execute on a computing system in the cloud and monitor operator metadata during runtime of the streams processing environment. In such a case, the tracker tool could identify instances where observed metadata values do not comply with expected metadata values and store records of such instances at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product, comprising:
a computer-readable storage medium having computer-readable program code embodied therewith, the computer-readable program code configured to perform an operation comprising:
during execution of a distributed application comprising a plurality of operators, monitoring a first operator of the plurality of operators distributed application, wherein an operator graph of the distributed application specifies a configuration of the plurality of operators, wherein the first operator is configured to receive tuples from one or more upstream operators as defined by the operator graph, wherein the first operator is configured to process the received tuples in a first manner, and wherein the first operator stores one or more specified metadata values, and
retrieving the one or more specified metadata values associated with the first operator, wherein the metadata values include whether a port of the first operator is an overloaded port or a combination port,
upon determining that at least one of the one or more specified metadata values does not comply with a corresponding expected metadata value,
generating an indicator for the first operator, wherein the indicator includes information describing the one or more specified metadata values, and
modifying the first operator to process subsequently received tuples from the one or more upstream operators in a second manner, rather than in the first manner,
wherein the first operator is modified based on the information included in the indicator,
wherein processing tuples in the first manner comprises processing an input tuple and outputting a resulting tuple for that input tuple, and
wherein modifying the first operator to process tuples in the second manner comprises modifying a behavior of the first operator to process tuples differently than previously specified wherein the first operator receives an input tuple during run-time but does not process the input tuple or does not output a resulting tuple for that input tuple when processing the received tuples in the second manner.

2. The computer program product of claim 1, wherein the indicator highlights the first operator in a graphical display of the plurality of operators.

3. The computer program product of claim 1, wherein the metadata values are values of at least one of an amount of overall tuples being output from the first operator, an amount of tuples being output from the port of the first operator, and an amount of tuples being input to the first operator, an amount of tuples being input to a port of the first operator.

4. The computer program product of claim 1, wherein the indicator generates a breakpoint in a debugger at the first operator.

5. The computer program product of claim 1, wherein the operation further comprises recording the information in a log.

6. The computer program product of claim 1, wherein the metadata values are values indicating a rate of at least one of an amount of tuples being output from the port of the first operator for each tuple being input to the port and an overall amount of tuples being output from the first operator for each tuple being input to the first operator.

7. The computer program product of claim 1, wherein the distributed application is a streams processing application.

8. The method of claim 1, wherein the operator graph further specifies at least one of which particular nodes to execute a specified processing element, a function of a specified operator, or a flow of tuples between operators and processing elements.

9. The method of claim 1, further comprising creating a graphical indication of an abnormality of the first operator responsive to the non-complying one of the one or more specified metadata values.

10. The method of claim 9, wherein the graphical indication is shown on an operator graph.

11. The method of claim 10, wherein the operator graph tracks the behavior of the first operator in real-time.

12. The method of claim 1, further comprising evaluating the metadata values for the first operator against expected values for the first operator.

13. The method of claim 1, wherein the one or more specified metadata values are variable over time.

14. The method of claim 1, wherein the first operator does not process the input tuple or does not output a resulting tuple for that input tuple when processing the received tuples in the second manner while the first operator remains in the operator graph.

15. A system, comprising:
   a processor; and
   a memory storing a program, which, when executed on the processor, performs an operation comprising:
      during execution of a distributed application comprising a plurality of operators, monitoring a first operator of the plurality of operators distributed application, wherein an operator graph of the distributed application specifies a configuration of the plurality of operators, wherein the first operator is configured to receive tuples from one or more upstream operators as defined by the operator graph, wherein the first operator is configured to process the received tuples in a first manner, and wherein the first operator stores one or more specified metadata values, and
      retrieving the one or more specified metadata values associated with the first operator, wherein the metadata values include whether a port of the first operator is an overloaded port or a combination port,
      upon determining that at least one of the one or more specified metadata values does not comply with a corresponding expected metadata value,
         generating an indicator for the first operator, wherein the indicator includes information describing the one or more specified metadata values, and
         modifying the first operator to process subsequently received tuples from the one or more upstream operators in a second manner, rather than in the first manner,
            wherein the first operator is modified based on the information included in the indicator,
            wherein processing tuples in the first manner comprises processing an input tuple and outputting a resulting tuple for that input tuple, and
            wherein modifying the first operator to process tuples in the second manner comprises modifying a behavior of the first operator to process tuples differently than previously specified wherein the first operator receives an input tuple during run-time but does not process the input tuple or does not output a resulting tuple for that input tuple when processing the received tuples in the second manner.

16. The system of claim 15, wherein the indicator highlights the first operator in a graphical display of the plurality of operators.

17. The system of claim 15, wherein the metadata values are values of at least one of an amount of overall tuples being output from the first operator, an amount of tuples being output from the port of the first operator, and an amount of tuples being input to the first operator, an amount of tuples being input to a port of the first operator.

18. The system of claim 15, wherein the indicator generates a breakpoint in a debugger at the first operator.

19. The system of claim 15, wherein the operation further comprises recording the information in a log.

20. The system of claim 15, wherein the metadata values are values indicating a rate of at least one of an amount of tuples being output from the port of the first operator for each tuple being input to the port and an overall amount of tuples being output from the first operator for each tuple being input to the first operator.

21. A computer program product, comprising:
   a non-transitory computer-readable storage medium having computer-readable program code embodied therewith, the computer-readable program code configured to perform an operation comprising:
      during execution of a distributed application comprising a plurality of operators, monitoring a first operator of the plurality of operators distributed application, wherein an operator graph of the distributed application specifies a configuration of the plurality of operators, wherein the first operator is configured to receive tuples from one or more upstream operators as defined by the operator graph, wherein the first operator is configured to process the received tuples in a first manner, and wherein the first operator stores one or more specified metadata values, and
      retrieving the one or more specified metadata values associated with the first operator, wherein the metadata values include whether a port of the first operator is an overloaded port or a combination port,
      upon determining that at least one of the one or more specified metadata values does not comply with a corresponding expected metadata value,
         generating an indicator for the first operator, wherein the indicator includes information describing the one or more specified metadata values, and
         modifying the first operator to process subsequently received tuples from the one or more upstream operators in a second manner, rather than in the first manner,
            wherein the operator is modified based on the information included in the indicator,
            wherein processing tuples in the first manner comprises processing an input tuple and outputting a resulting tuple for that input tuple, and
            wherein modifying the first operator to process tuples in the second manner comprises modifying a behavior of the first operator to process tuples differently than previously specified wherein the first operator does not process the input tuple or does not output a resulting tuple for that input tuple when processing the received tuples in the second manner while the first operator remains in the operator graph.

* * * * *